United States Patent [19]
Tsumura et al.

[11] Patent Number: 5,304,308
[45] Date of Patent: Apr. 19, 1994

[54] CONTROL METHOD IN DOUBLE-TANK-TYPE INTERMITTENT AERATION ACTIVATED SLUDGE PROCESS

[75] Inventors: Kazushi Tsumura, Kyoto; Yasuji Yamamoto, Nara; Kosei Sasaki; Shigeru Hatsumata, both of Kanagawa, all of Japan

[73] Assignees: Fuji Electric Co., Ltd., Kanagawa; Unitika Ltd., Hyogo, both of Japan

[21] Appl. No.: 53,018

[22] Filed: Apr. 27, 1993

[30] Foreign Application Priority Data

Jun. 8, 1992 [JP] Japan .................................. 4-146054
Sep. 2, 1992 [JP] Japan .................................. 4-233953

[51] Int. Cl.$^5$ .............................................. C02F 3/30
[52] U.S. Cl. ..................... 210/614; 210/626; 210/630; 210/746; 210/903; 210/906
[58] Field of Search ............. 210/605, 614, 623, 626, 210/628, 629, 630, 739, 746, 903, 906

[56] References Cited

U.S. PATENT DOCUMENTS

| | | | |
|---|---|---|---|
| 4,425,231 | 1/1984 | Fujimoto et al. | 210/605 |
| 4,431,543 | 2/1984 | Matsuo et al. | 210/605 |
| 4,663,044 | 5/1987 | Goronszy | 210/903 |
| 4,832,847 | 5/1989 | Fujii et al. | 210/616 |
| 4,867,883 | 9/1989 | Daigger et al. | 210/605 |

FOREIGN PATENT DOCUMENTS

| | | | |
|---|---|---|---|
| 0396057 | 4/1990 | European Pat. Off. | 210/614 |
| 63-35317(B2) | 7/1988 | Japan . | |
| 64-70198(A) | 3/1989 | Japan . | |

*Primary Examiner*—Thomas Wyse
*Attorney, Agent, or Firm*—Finnegan, Henderson, Farabow, Garrett & Dunner

[57] ABSTRACT

In an intermittent aeration activated sludge process in which aeration and agitation is repeated alternately, a first aeration tank and a second aeration tank are connected to each other and an ORP meter is applied to each tank. In the first aeration tank, the sum of an aeration period and a denitrification period of an agitation step is controlled to a predetermined period $T_{gs}$ based on a time when a bending point appeared on an ORP curve in a previous cycle. In the second aeration tank, the sum of an aeration period and an agitation period is controlled to a predetermined period $T_{ds}$ longer than $T_{gs}$ based on a time when an ORP measured value reached a predetermined value in a previous cycle. Operations of the first and second aeration tanks are simultaneously transferred from the agitation to the aeration based on detection of the predetermined ORP value. As a result, a necessary anaerobic condition period is secured in the first aeration tank.

11 Claims, 8 Drawing Sheets

CONTROL METHOD IN DOUBLE-TANK-TYPE INTERMITTENT AERATION ACTIVATED SLUDGE PROCESS

BACKGROUND OF THE INVENTION

The present invention relates to a process of biologically treating sewage including domestic one. More specifically, the invention relates to a control method in an intermittent aeration activated sludge process which can eliminate nitrogen and phosphorus from sewage.

Conventional processes for treating sewage, which are generally biological processes typically exemplified by the activated sludge process, have been mainly directed to the removal of organic matter. However, in order to cope with the recent serious problem of eutrophication in closed water areas such as lakes and marshes, it is important to eliminate nitrogen and phosphorus that may cause the eutrophication. To this end, as improvements of the activated sludge process, various treatment processes have been developed which can eliminate not only organic matter but also nitrogen and phosphorus. Typical examples of such new processes include the $A_2O$ process, sequencing batch reactor activated sludge process, and intermittent aeration activated sludge process (hereinafter abbreviated as "intermittent aeration process"). In these processes, bacteria are alternately placed under the aerobic and anaerobic conditions to eliminate organic matter, nitrogen and phosphorus.

The principle of the sewage treatment for eliminating nitrogen and phosphorus is briefly described below. Organic matter in sewage is decomposed and eliminated by being eaten by bacteria that constitute the activated sludge. Nitrogen is eliminated such that $NH_4-N$ (ammonia nitrogen) is oxidized under an aerobic condition to $NO_3-N$ (nitrate nitrogen) by an activity of nitrifying bacteria, which is then reduced under an anaerobic condition to $N_2$ (nitrogen gas) by an activity of denitrifying bacteria. The nitrification and denitrification are summarized below.

| Reaction | Nitrogen form change | Reaction condition | Bacteria |
| --- | --- | --- | --- |
| Nitrification | $NH_4-N \rightarrow NO_3-N$ | Aerobic (with DO) | Nitrifying bacteria |
| Denitrification | $NO_3-N \rightarrow N_2$ | Anaerobic (without DO) | Denitrifying bacteria |

Phosphorus is eliminated by utilizing activated sludge including bacteria capable of storing a large amount of phosphorus in their cells. This type of activated sludge is produced by alternately changing the operation condition of the aeration tank between aerobic and anaerobic conditions. Since this activated sludge releases phosphorus under the anaerobic condition and absorbs phosphorus under the aerobic condition, phosphorus can be eliminated by making the sludge absorb phosphorus under the aerobic condition and then removing the sludge that has absorbed a large amount of phosphorus from the treatment apparatus as excess sludge. The above process is summarized as follows.

| Reaction | Phosphorus concentration in tank | Reaction condition | Phosphorus removal |
| --- | --- | --- | --- |
| Phosphorus release | Increase | Anaerobic (without DO) | — |
| Phosphorus absorption | Decrease | Aerobic (with DO) | Removal of activated sludge |

As described above, the aerobic and anaerobic conditions are indispensable to the removal of nitrogen and phosphorus. Stated strictly, the anaerobic condition for the denitrification and that for the phosphorus release are different. In the intermittent aeration process, the phosphorus release from the activated sludge occurs after the denitrification is finished and oxygen molecules (originating from $NO_3-N$) become absent from the tank, and subsequently the phosphorus absorption is performed in the next aeration step.

Much attention is now given to the intermittent aeration process because the ratio between the anaerobic condition steps can be set in terms of a time period and it can be applied to existing treatment facilities relatively easily. However, in order to efficiently eliminate nitrogen and phosphorus in the intermittent aeration process, it is necessary to properly control the aeration period and the agitation period (anaerobic condition) in accordance with the load. Several control methods have been proposed conventionally, two typical examples of which are disclosed in Japanese Patent Application Examined Publication No. Sho. 63-35317 and Japanese Patent Application Unexamined Publication No. Sho. 64-70198. In the control method disclosed in the former publication, an ORP meter (oxidation-reduction potential meter) is applied to an aeration tank. When the ORP value exceeds the range of $+120$ to $+200$ mV, the aeration is stopped to start the agitation. When it becomes smaller than the $-250$ to $-350$ mV range, the agitation is stopped to start the aeration. The publication Sho. 64-70198 describes a process for eliminating nitrogen from sewage in which the nitrification and denitrification in a tank is controlled on the basis of a detected ORP changing rate of the tank. More specifically, a bending point of the ORP variation is detected in an aeration step and the aeration step is stopped to transfer to an agitation step with the bending point regarded as a finishing point of the nitrification. In the agitation step for the denitrification, the agitation is stopped to start the aeration step when the ORP changing rate reaches a predetermined value (the denitrification is regarded as finished).

However, since the above control methods are directed to the treatment process that has a single aeration tank and a settling tank, they are associated with a problem that the quality of effluent is not stabilized. To solve this problem, the present inventors have conceived an apparatus consisting of a first aeration tank into which sewage flows, a second aeration tank that is connected in series to the first aeration tank, and a final settling tank, and also have proposed a control method therefor. FIG. 11 schematically shows the main part of this apparatus including a control system. Referring to FIG. 11, an intermittent aeration process and a control method of this apparatus is summarized below. In FIG. 11, paths of water and air are indicated by solid lines and arrows, and control signal lines are indicated by dashed lines and arrows. This apparatus mainly consists of first and second aeration tanks 2a and 2b for eliminating organic matter, nitrogen and phosphorus from sewage 1 flowing thereto by means of activated sludge, a final settling tank 4 for separating the activated sludge by gravitational sedimentation to obtain effluent 3, and a pump 5 for returning the sedimented activated sludge to the first aeration tank 2a. The first and second aeration tanks 2a and 2b have a capacity ratio of 1:1, and the hydraulic retention time of the sewage 1 in the apparatus is 16-32 hours in total. The control system consists of a DO (dissolved oxygen) meter 10a for measuring a dissolved oxygen concentration of the first aeration tank 2a, an ORP meter 6b for measuring an oxidation-reduction potential of the second aeration tank 2b, a control panel 9 for providing, based on the values of the above measurements, control signals to an inverter 11a for controlling the DO concentration of the first aeration tank 2a, a first aeration blower 7a, a second aeration blower 7b, a first agitation pump 8a and a second agitation pump 8b.

According to a typical control method of the above apparatus, the aeration period is set at one hour and the DO concentration of the first aeration tank 2a during the aeration period is controlled at 0.2 mg/l. During the agitation period, an OP changing rate of the second aeration tank 2b is measured and a bending point of the ORP is detected by performing a predetermined calculation. Upon detecting the bending point, the agitation is stopped to start the aeration. The aeration of the first aeration tank 2a and that of the second aeration tank 2b are performed simultaneously, and the agitation of the tank 2a and that of the tank 2b are also done simultaneously.

The treatment process proceeds in the following manner. In the first aeration tank 2a, the nitrification and the denitrification proceed simultaneously (aerobic denitrification) while the DO concentration is controlled to be kept low. In the second aeration tank 2b, the nitrification proceeds while the DO concentration is kept at about 2-3 mg/l and, at the same time, phosphorus is absorbed by the activated sludge. After a lapse of one hour, the process automatically transfers to the agitation step. In the agitation step, the denitrification finishes in a short period in the first aeration tank 2a because the aerobic denitrification has proceeded in the previous aeration step and therefore the $NO_3$-N concentration is low. Then, phosphorus is released from the activated sludge. The denitrification proceeds slowly in the second aeration tank 2b because the organic matter concentration is low and, at the same time, the ORP decreases. Since the ORP varies to produce a bending point when the denitrification is completed, the agitation is stopped when the bending point is detected and the process transfers to the aeration step. Therefore, almost no phosphorus release occurs in the second aeration tank 2b. That is, in the agitation step, the phosphorus release is performed mainly in the first aeration tank 2a and the denitrification is performed mainly in the second aeration tank 2b. By virtue of the existence of two aeration tanks, the above-described process has an advantage that the influent is more unlikely to be discharged without being subjected to the treatment than in the case of using only one aeration tank.

However, the present inventors have thereafter found that the above-described control method has the following problem. That is, since the agitation period depends on the quality of the influent, the efficiency of eliminating nitrogen and phosphorus decreases depending on the concentrations of nitrogen and phosphorus in the influent. For example, where the nitrogen concentration in the influent is low and the phosphorus concentration is high, the agitation period of the second aeration tank 2b is short because the denitrification finishes in a short period. In this case, the short agitation period causes shortage of phosphorus release period in the first aeration tank 2a. As a result, the phosphorus absorption in the aeration step becomes insufficient to deteriorate the phosphorus removal efficiency. Further, since the low DO concentration operation of the first aeration tank 2a suppresses the growth of nitrifying bacteria, the nitrification capability of the entire apparatus becomes insufficient for a nitrogen load when the nitrogen concentration is high. In this case, the nitrification becomes incomplete and the nitrogen removal efficiency becomes low.

SUMMARY OF THE INVENTION

The present invention has been made in view of the above problems in the art, and has an object of providing a control method in an intermittent aeration process in which the quality of effluent is stabilized and highly efficient denitrification and phosphorus removal are obtained irrespective of nitrogen and phosphorus concentrations in influent.

According to the control method of the invention, first and second aeration tanks are employed in an intermittent aeration process, and operations of the first and second aeration tanks are controlled using a DO meter and an ORP meter.

According to first and second control methods of the invention, an ORP meter is applied to the second aeration tank. In the first aeration tank, after aeration is performed for a predetermined period $T_a$, the aeration is stopped to start agitation. In the second aeration tank, the sum $T_d$ of an aeration period $T_b$ and an agitation period $T_c$ is controlled to a predetermined period $T_{ds}$ longer than $T_a$ based on a time when a bending point appeared on an ORP curve detected by the ORP meter in a previous cycle (first method) or on a time when an ORP value reached a predetermined value in a previous cycle (second method). Operations of the first and second aeration tanks are simultaneously transferred from the agitation to the aeration based on detection of the ORP bending point (first method) or the ORP value equal to the predetermined value (second method).

More specifically, according to the first control method, nitrification and phosphorus absorption proceed in the first aeration tank for the predetermined period $T_a$, for instance, 60 minutes. After a lapse of 60 minutes, the aeration is stopped to start the agitation, i.e., to start denitrification and phosphorus release. In the second aeration tank, the sum $T_d$ of the aeration period $T_b$ for the nitrification and phosphorus absorption and the agitation period $T_c$ for the denitrification is controlled to assure that phosphorus has been released sufficiently in the first aeration tank when the denitrification of the agitation step is completed. That is, the sum period $T_d$ is controlled to the period $T_{ds}$ that is preset at a one-cycle period of the intermittent aeration determined by considering the phosphorus release period. For example, if the control is performed with $T_{ds}$ set at 120 minutes, the phosphorus release period of about 50 minutes is secured in the first aeration tank. The agitation period $T_c$ is measured as a period from the start of the agitation to the appearance of the bending point B on the ORP curve detected by the ORP meter (the bending point B is associated with the completion of the denitrification). The sum period $T_d$ is obtained by adding $T_c$ to $T_b$. The aeration period $T_b$ is adjusted based on the period $T_d$ in a previous cycle so that $T_d$ coincides with $T_{ds}$. With the above control, even if the influent has a low nitrogen concentration, sufficient phosphorus release period can be secured in the first aeration tank. Therefore, the phosphorus absorption during the next aeration step is enhanced to provide a high phosphorus removal efficiency. Further, since the nitrification and the denitrification are performed in both of the first and second aeration tanks, it is apparent that this control method can provide a high nitrogen removal efficiency.

The second control method is different from the first control method only in the method of detecting the completion of the denitrification in the second aeration tank. That is, since the ORP value corresponding to the completion of the denitrification is almost fixed, this ORP value is preset, and as soon as the ORP value detected by the ORP meter reaches the preset ORP value, the denitrification is stopped to transfer to the aeration step judging that the denitrification has been completed.

According to third and fourth control methods, a DO meter and a first ORP meter are applied to the first aeration tank and a second ORP meter is applied to the second aeration tank. In the first aeration tank, a DO concentration is controlled so that the sum $T_g$ of an aeration period $T_e$ and a denitrification period $T_f$ of an agitation step becomes equal to a predetermined period $T_{gs}$ based on a time when a bending point appeared on an ORP curve detected by the first ORP meter in a previous cycle. In the second aeration tank, the sum $T_d$ of an aeration period $T_b$ and an agitation period $T_c$ is controlled to a predetermined period $T_{ds}$ longer than $T_{gs}$ based on a time when a bending point appeared on an ORP curve detected by the second ORP meter in a previous cycle (third method) or on a time when an ORP value reached a predetermined value in a previous cycle (fourth method). Operations of the first and second aeration tanks are simultaneously transferred from the agitation to the aeration based on detection of the ORP bending point (third method) or of the ORP value equal to the predetermined value (fourth method).

More specifically, according to the third control method, the aeration period $T_e$ is set at a predetermined period, and the sum period $T_g$ being $T_e$ plus the denitrification period $T_f$ is controlled to the predetermined period $T_{gs}$. For example, nitrification and phosphorus absorption proceed during aeration period $T_e$ that is set at 30 minutes. After a lapse of 30 minutes, the aeration is stopped to start the agitation, i.e., to start denitrification. The denitrification period $T_f$ is measured as a period from the start of the agitation to the appearance of the bending point A on the ORP curve detected by the first ORP meter (the bending point A is associated with the completion of the denitrification). The sum period $T_g$ is obtained by adding $T_f$ to $T_e$. Although the agitation continues thereafter, after the lapse of $T_g$ phosphorus is released from the activated sludge in the first aeration tank. Since a sufficient phosphorus release period is required for phosphorus removal, the sum period $T_g$ is controlled to be a predetermined period in the first aeration tank so that $T_g$ does not become unduly long. For example, if the period $T_{gs}$ is set at 60 minutes, since the aeration period $T_e$ is fixed at 30 minutes the denitrification period $T_f$ needs to be controlled to 30 minutes. Since the denitrification period $T_f$ is proportional to the concentration of $NO_3$-N that has been generated by the nitrification during the aeration period $T_e$, the denitrification period $T_f$ can be controlled by controlling the nitrification during the aeration period $T_e$ and, as a result, $T_g$ can be controlled to $T_{gs}$. The DO concentration control is performed during the aeration period $T_e$ because the activity of nitrifying bacteria depends on the Do concentration and therefore the nitrification can be controlled by the DO concentration control. The DO concentration is set based on the sum period $T_g$ in a previous cycle. A specific control method with respect to the second aeration tank is not described here because it is similar to that of the first control method. Since the sum period $T_g$ can be controlled stably to 60 minutes in the first aeration tank, the third control method can almost certainly assure the phosphorus release period of about 60 minutes to provide a high phosphorus removal efficiency. Further, since the DO concentration in the first aeration tank does not become too low, the growth of nitrifying bacteria is scarcely suppressed and therefore the apparatus can maintain, as a whole, a high nitrification ability. As a result, even if the influent has a high nitrogen concentration, a high nitrogen removal efficiency can be obtained.

The fourth control method is different from the third control method only in the method of detecting the completion of the denitrification in the second aeration tank. That is, since the ORP value corresponding to the completion of the denitrification is almost fixed, this ORP value is preset, and as soon as the ORP value detected by the second ORP meter reaches the preset ORP value, the denitrification is stopped to transfer to the aeration step judging that the denitrification has been completed.

According to fifth and sixth control methods, a first ORP meter is applied to the first aeration tank and a second ORP meter is applied to the second aeration tank. In the first aeration tank, the sum $T_g$ of an aeration period $T_e$ and a denitrification period $T_f$ of an agitation step becomes equal to a predetermined period $T_{gs}$ based on a time when a bending point appeared on an ORP curve detected by the first ORP meter in a previous cycle. In the second aeration tank, the sum $T_d$ of an aeration period $T_b$ and an agitation period $T_c$ is controlled to a predetermined period $T_{ds}$ longer than $T_{gs}$ based on a time when a bending point appeared on an ORP curve detected by the second ORP meter in a previous cycle (fifth method) or on a time when an ORP value reached a predetermined value in a previous cycle (sixth method). Operations of the first and second aeration tanks are simultaneously transferred from the agitation to the aeration based on detection of the ORP bending point (fifth method) or of the ORP value equal to the predetermined value (sixth method).

More specifically, according to the fifth control method, the sum period $T_g$ being the aeration period $T_e$ plus the denitrification period $T_f$ is controlled to the predetermined period $T_{gs}$. Nitrification and phosphorus absorption are performed during the aeration period $T_e$, and then the aeration is stopped to start the agitation, i.e., to start denitrification. The denitrification period $T_f$ is measured as a period from the start of the agitation to the appearance of the bending point A on the ORP curve detected by the first ORP meter (the bending point A is associated with the completion of the denitrification). The sum period $T_g$ is obtained by adding $T_f$ to $T_e$. Although the agitation continues thereafter, after the lapse of $T_g$ phosphorus is released from the activated sludge in the first aeration tank. Since a sufficient phosphorus release period is required for phosphorus removal, the sum period $T_g$ is controlled to the predetermined period $T_{gs}$, for instance, 60 minutes in the first aeration tank so that $T_g$ does not become unduly long. In this control method, there is no limitations on the proportion between $T_e$ and $T_f$ and it is just necessary that the sum period $T_g$ be controlled to $T_{gs}$, i.e., 60 minutes. To this end, the aeration period $T_e$ is adjusted based on the sum period $T_g$ in a previous cycle. A specific control method with respect to the second aeration tank is not described here because it is similar to that of the first control method. Since the sum period $T_g$ can be controlled stably to 60 minutes in the first aeration tank, the fifth control method can almost certainly assure the phosphorus release period of about 60 minutes to provide a high phosphorus removal efficiency. Further, since the DO concentration in the first aeration tank can be kept in a range where the growth of nitrifying bacteria is not suppressed and therefore the apparatus can maintain, as a whole, a high nitrification ability. As a result, even if the influent has a high nitrogen concentration, a high nitrogen removal efficiency can be obtained.

The sixth control method is different from the fifth control method only in the method of detecting the completion of the denitrification in the second aeration tank. That is, since the ORP value corresponding to the completion of the denitrification is almost fixed, this ORP value is preset, and as soon as the ORP value detected by the second ORP meter reaches the preset ORP value, the denitrification is stopped to transfer to the aeration step judging that the denitrification has been completed.

DESCRIPTION OF THE PREFERRED EMBODIMENTS

The fundamental concept of the present invention is described first. In conducting experiments of controlling the double-tank intermittent aeration process, the present inventors have found the following control method very effective to eliminate nitrogen and phosphorus simultaneously and efficiently irrespective of their concentrations. That is, in the first tank, a nitrification and denitrification period is controlled to a fixed period to secure a sufficient phosphorus release period positively. In the second tank, while nitrification and denitrification are performed, a one-cycle period of the control is maintained at a predetermined period. In other words, while the one-cycle period is controlled in the second tank, in the first tank a sufficient phosphorus release period that is necessary for phosphorus removal is secured in the one-cycle period. Further, the nitrification, denitrification and phosphorus removal are performed in the process that is subjected to the above control.

Embodiments of control methods of the invention are described hereinafter with reference to the accompanying drawings.

Figure 1:
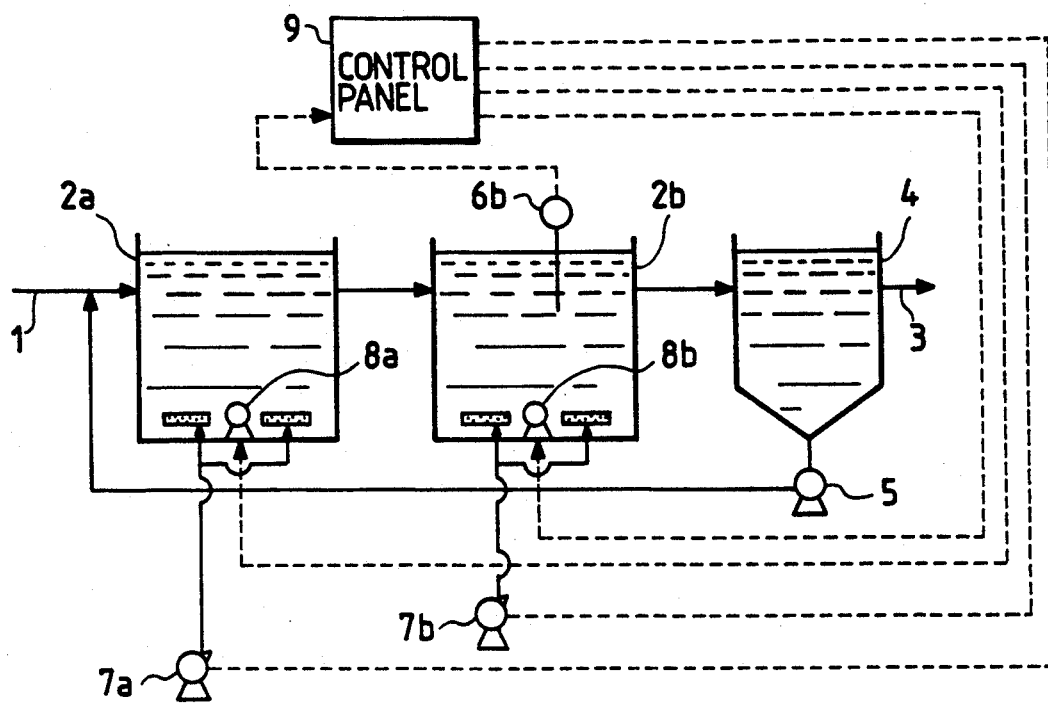
FIG. 1 schematically shows the main part of a sewage treatment apparatus to which first and second control methods of the present invention are applied.
Figure 11:
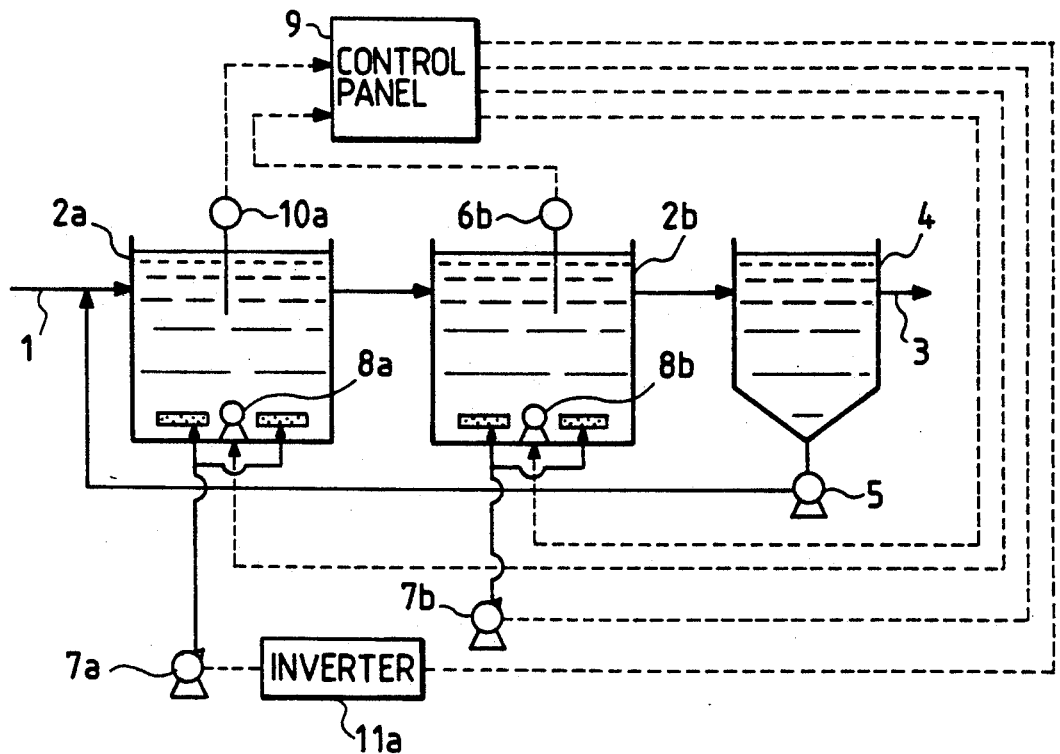
FIG. 11 schematically shows the main part of a sewage treatment apparatus to which a control method previously conceived by the present inventors is applied.

FIG. 1 schematically shows the main part of an intermittent aeration apparatus, including a control system, to which a first control method of the invention is applied. The parts common to those in FIG. 11 are represented by the same symbols, and the meaning of the lines with arrows is the same as in FIG. 11. The apparatus of FIG. 1 is basically the same as that of FIG. 11 except that the FIG. 1 apparatus does not have the DO meter 10a and the inverter 11a of the FIG. 11 apparatus.

Figure 2A:
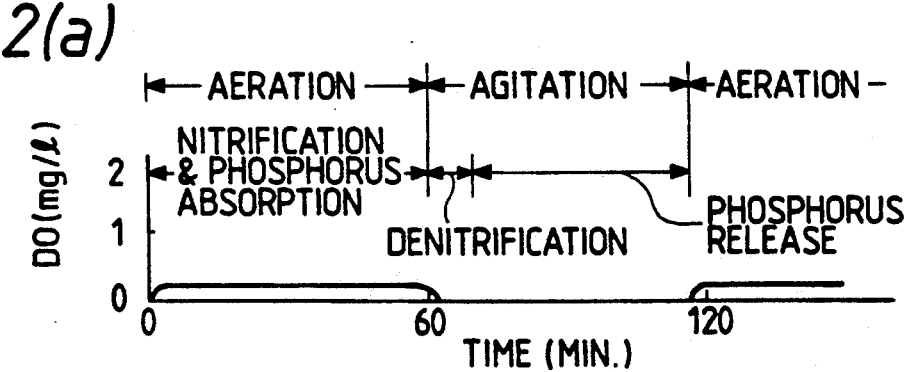
FIG. 2(a) is a graph showing a variation of the DO concentration of a first aeration tank with respect to the elapsed time in the first and second control methods.
Figure 2B:
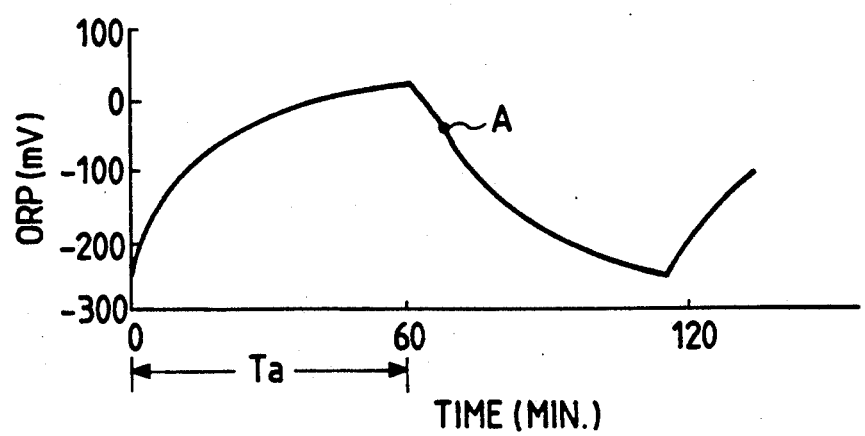
FIG. 2(b) is a graph showing a variation of the ORP of the first aeration tank with respect to the elapsed time in the first and second control methods.
Figure 3A:
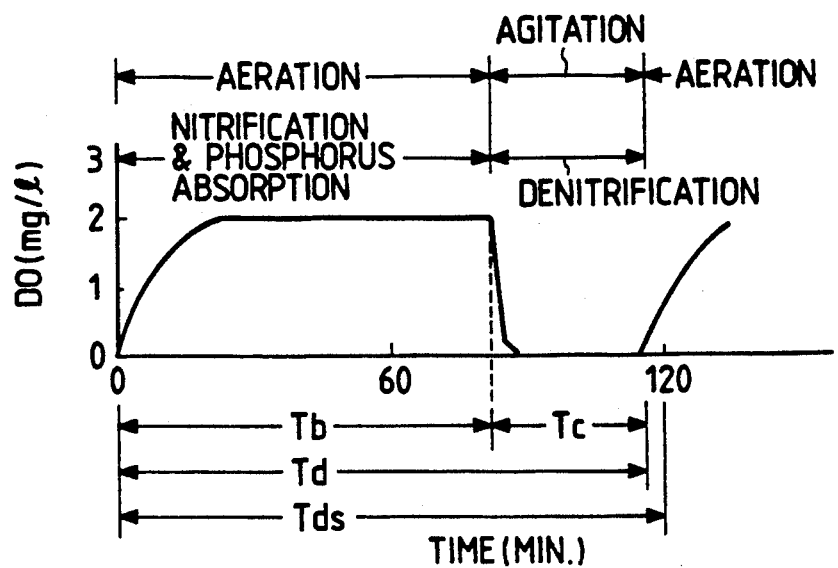
FIG. 3(a) is a graph showing a variation of the DO concentration of a second aeration tank with respect to the elapsed time in the first and second control methods.
Figure 3B:
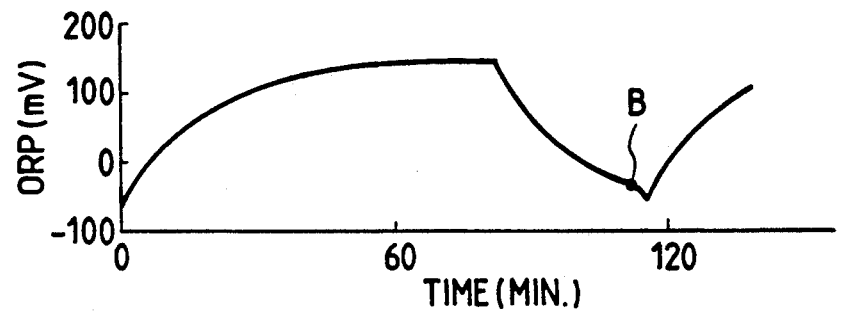
FIG. 3(b) is a graph showing a variation of the ORP of the second aeration tank with respect to the elapsed time in the first and second control methods.

The first control method of the invention to be applied to the apparatus of FIG. 1 is described below also with reference to FIGS. 2(a)-2(b) and 3(a)-3(b). FIGS. 2(a) and 2(b) are graphs respectively showing variations of the DO concentration and ORP of the first aeration tank 2a with respect to the elapsed time, and the operation status of the first aeration tank 2a is indicated in FIG. 2(a). Similarly, FIGS. 3(a) and 3(b) are graphs respectively showing variations of the DO concentration and ORP of the second aeration tank 2b with respect to the elapsed time, and the operation status of the second aeration tank 2b is indicated in FIG. 3(a). The variations of the DO concentration and ORP shown in FIGS. 2(a)-2(b) and 3(a)-3(b) are ones taken at an arbitrary time point (the origin of the graphs is the aeration start time) while the first control method of the invention is being practiced.

In the first aeration tank 2a, the DO concentration is set at a low value of about 0.2 mg/l. This may be done by adjusting the air flow rate of the first aeration blower 7a in proportion to the flow rate of the influent 1. The aeration period is preset at 60 minutes. That is, the aeration is stopped upon the lapse of 60 minutes. In the first aeration tank 2a, in addition to the removal of organic matter, the nitrification and denitrification simultaneously proceed because of the low DO concentration. Further, phosphorus is absorbed by the activated sludge. After the transfer to the agitation step, the DO concentration immediately drops to zero and the ORP decreases to have a bending point A (see FIG. 2(b)) about 10 minutes after the start of the agitation. The bending point A appears at a time point when the denitrification is completed, and the phosphorus release from the activated sludge proceeds during the remaining agitation step. This release period needs to be long enough to assure a high efficiency of phosphorus removal. This is done by properly controlling the second aeration tank 2b.

Control on the second aeration tank 2b and resultant alteration of water quality are described below. A period $T_{ds}$ that corresponds to the one-cycle period of the control, i.e., the sum of the aeration period and the agitation period is set at 120 minutes. The aeration of the second tank 2b is started at the same time as the first aeration tank 2a, and during an aeration period $T_b$ the ordinary aeration is performed with the DO concentration set at 2-3 mg/l (suitable for the nitrification), to allow the nitrification and phosphorus absorption to proceed simultaneously. The nitrification is finished in the period $T_b$, and NH$_4$-N that has not been nitrified in the first aeration tank 2a is converted to NO$_3$-N. After the lapse of $T_b$, the process transfers to the agitation step to start the denitrification. Since the denitrification in the second aeration tank 2b is one due to endogenous respiration, the denitrification rate is relatively low and therefore the ORP decreases slowly. Upon completion of the denitrification, a bending point B (see FIG. 3(b)) appears on an ORP curve obtained by the ORP meter 6b. The detection of the bending point B gives an agitation period $T_c$, and a period $T_d$ is obtained by adding $T_c$ to $T_b$. As shown in FIG. 3(a), $T_b$, $T_c$ and $T_d$ are 80 minutes, 35 minutes and 115 minutes, respectively. The one-cycle period of the control is finished upon the detection of the bending point B, and the first and second aeration tanks 2a and 2b return to the aeration step at the same time. As a result of the above control, the phosphorus release is performed in the first aeration tank 2a for 45 minutes, which means that a sufficient phosphorus release period is secured positively without being influenced by the quality of influent. The secured sufficiently long period of the phosphorus release leads to satisfactory phosphorus absorption in the aeration step to thereby provide a high phosphorus removal efficiency. Since the denitrification period of the second aeration tank 2b is determined by the quality of influent and the state of the activated sludge, a 5-minute difference from the preset period is corrected in the next cycle by adjusting the aeration period $T_b$ to equalize $T_d$ to $T_{ds}$.

Specifically, the aeration period $T_b$ is adjusted according to equation (1):

$$T_{bn} = T_{bn-1} + K_1(T_{ds} - T_d) \ldots \qquad (1)$$

where $T_{bn}$: aeration period of the second aeration tank in the next cycle, $T_{bn-1}$: aeration period of the second aeration tank in the current cycle, $K_1$: constant, $T_{ds}$: preset value of the sum of the aeration period and the agitation period, and $T_d$: sum of the aeration period and the agitation period in the current cycle.

The sum period $T_d$ may be an average (moving average) over several cycles before the current cycle of the sums of the aeration period and the agitation period of the second aeration tank 2b.

In the first aeration tank 2a, the growth of nitrifying bacteria is suppressed because of the low DO concentration. However, since the first control method of the invention is directed to the case of the low nitrogen concentration, there does not occur such a case that the nitrification and denitrification rates become insufficient to deteriorate the nitrogen removal efficiency. The phosphorus removal is completed by wasting, as excess sludge, the activated sludge that includes a large amount of phosphorus from the settling tank 4 (This step is not shown in FIG. 1). As described above, according to the first control method of the invention, the denitrification and phosphorus removal proceed satisfactorily. It is noted that the point at which the slope of the ORP curve obtained by the ORP meter 6b for the second aeration tank 2b changes suddenly is employed as the bending point B.

The bending point B is detected in the following manner. The slope of the ORP curve is calculated with a time increment $\Delta t$. Then, $D_n/D_{n-1}$ is calculated, where $D_n$ and $D_{n-1}$ represent slopes at a certain time point and a time point $\Delta t$ before it, respectively. The ratio $D_n/D_{n-1}$ is about unity while the slope of the ORP curve does not vary, and takes a larger value ranging from 1.5 to 4 when the slope suddenly changes at the bending point B. Therefore, employing a threshold of, for instance, 1.5, the bending point B can be detected when a condition $D_n/D_{n-1} \geq 1.5$ is satisfied.

A second control method according to the invention is described below. Since the second control method is basically the same as the first control method except for the method of detecting the completion of the agitation step of the second aeration tank 2b, the following description is directed only to that difference. In the agitation step of the second aeration tank 2b as shown in FIG. 3(b), the ORP curve has the bending point B (ORP value is about $-50$ mV) when the denitrification is completed. According to the studies of the present inventors, in many cases the ORP value corresponding to the completion of the denitrification is within the range of $+50$ to $-150$ mV, and once the quality of influent and the operation conditions are determined the ORP at the bending point B takes an almost fixed value. Therefore, by experimentally predetermining the ORP value at the bending point B for a subject sewage treatment apparatus, the completion of the denitrification can be detected without detecting the bending point B. Based on this fact, according to the second control method of the invention, an ORP threshold value of the ORP meter 6b is set at a value that has been predetermined experimentally, and the agitation is stopped to transfer to the aeration step as soon as the ORP is decreased down to the threshold value. Since the remaining control is the same as the first control method, descriptions therefor are omitted here.

Figure 4:
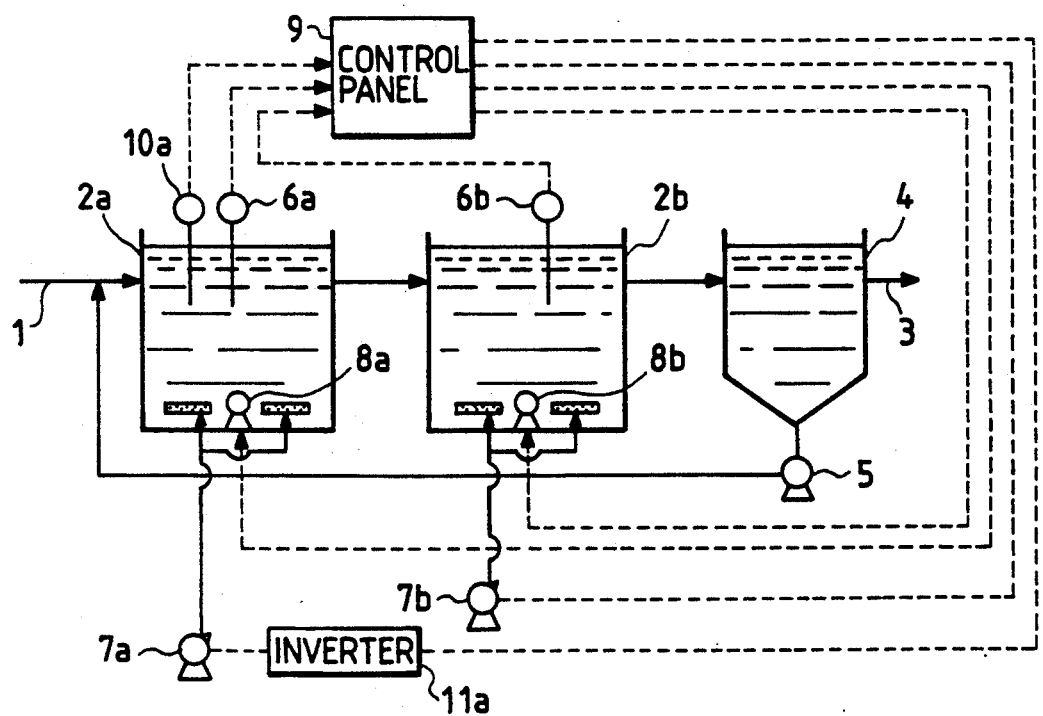
FIG. 4 schematically shows the main part of a sewage treatment apparatus to which third and fourth control methods of the invention are applied.

A third control method of the invention is described below with reference to the drawings. FIG. 4 schematically shows the main part of an intermittent aeration apparatus, including a control system, to which the third control method of the invention is applied. The parts common to those in FIG. 11 are represented by the same symbols, and descriptions therefor are omitted here. The apparatus of FIG. 4 is different from that of FIG. 11 in that a first ORP meter 6a for detecting an ORP bending point is applied to the first aeration tank 2a.

Figure 5A:
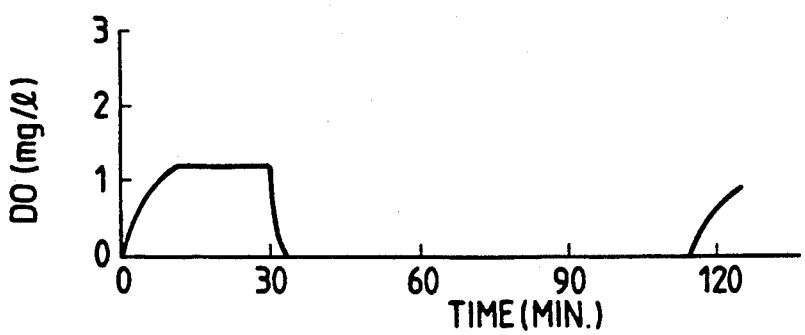
FIG. 5(a) is a graph showing a variation of the DO concentration of a first aeration tank with respect to the elapsed time in the third and fourth control methods.
Figure 5B:
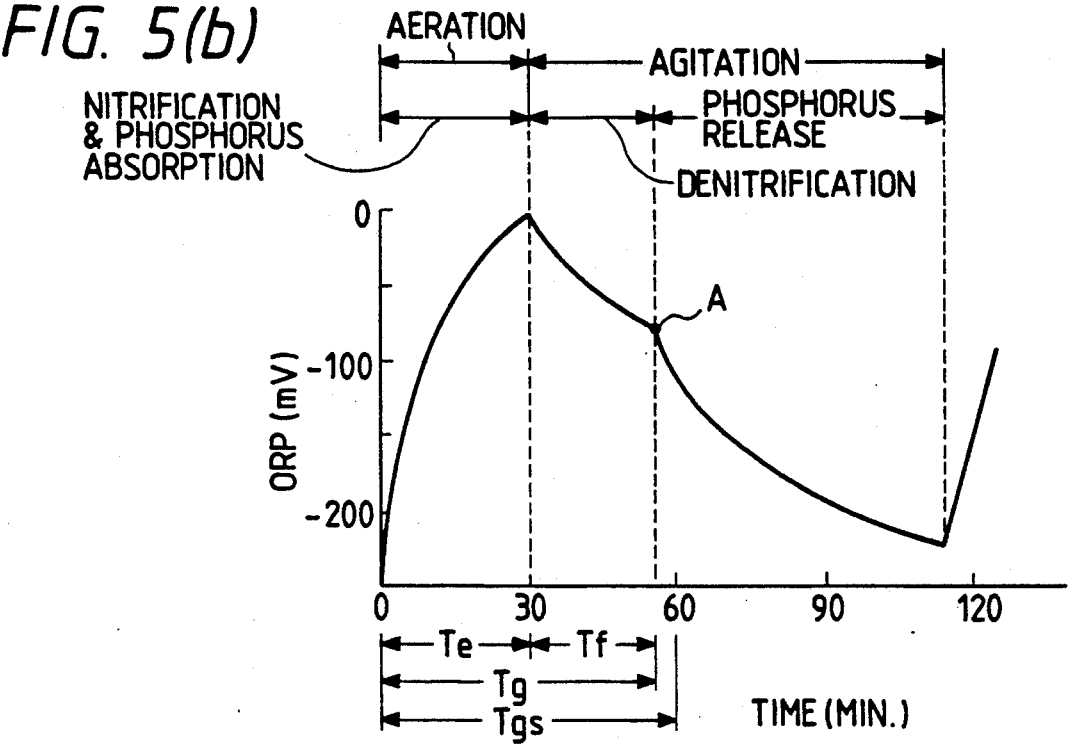
FIG. 5(b) is a graph showing a variation of the ORP of the first aeration tank with respect to the elapsed time in the third and fourth control methods.
Figure 5C:
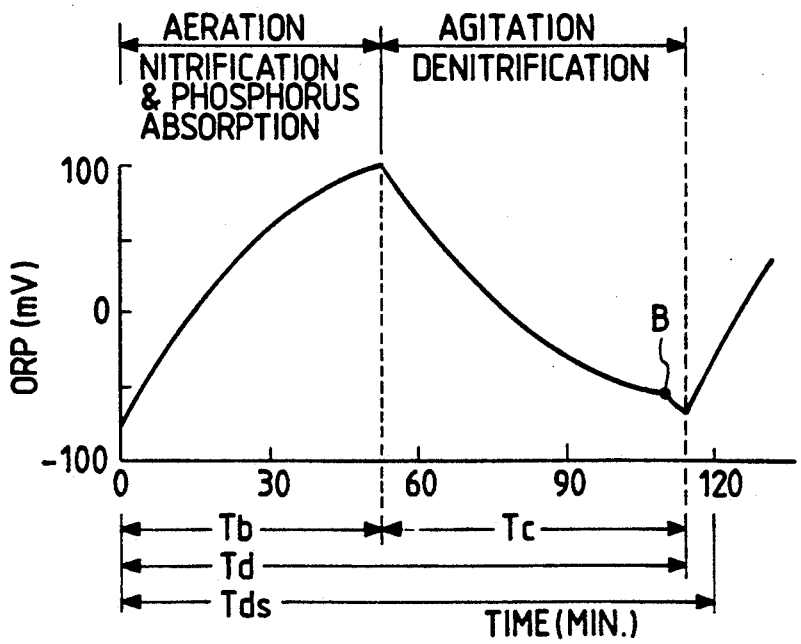
FIG. 5(c) is a graph showing a variation of the ORP of a second aeration tank with respect to the elapsed time in the third and fourth control methods.

The third control method of the invention to be applied to the apparatus of FIG. 4 is described below also with reference to FIGS. 5(a)-5(c). FIGS. 5(a) and 5(b) are graphs respectively showing variations of the DO concentration and ORP of the first aeration tank 2a with respect to the elapsed time, and the operation status of the first aeration tank 2a is indicated in FIG. 5(b). Similarly, FIG. 5(c) is a graph showing a variation of the ORP of the second aeration tank 2b with respect to the elapsed time, and the operation status of the second aeration tank 2b is indicated in FIG. 5(c). The variations of the DO concentration and ORP shown in FIGS. 5(a)-5(c) are ones taken at an arbitrary time point (the origin of the graphs is the aeration start time) while the third control method of the invention is being practiced.

In the first aeration tank 2a, an aeration period $T_e$ is set at 30 minutes and a preset period $T_{gs}$ of the sum of the aeration period and the denitrification period is 60 minutes. During the aeration period $T_e$, the DO control is performed with a preset DO value of 1.2 mg/l, and the nitrification and the phosphorus absorption proceed. After a lapse of 30 minutes, the process transfers to the agitation step to start the denitrification. On an ORP curve detected by the first ORP meter 6a, a bending point A appears 25 minutes after the start of the agitation (see FIG. 5(b)). A denitrification period $T_f$ is measured by detecting the bending point A, and a period $T_g$ amounts to $(30+25)=55$ minutes. The measured period $T_g$ being 5-minutes shorter than the preset period $T_{gs}$ is due to a shortage of the denitrification period $T_f$, i.e., insufficient nitrification during the aeration period $T_e$. This means that the DO concentration which has been determined from the period $T_g$ of the preceding cycle is too low and the nitrification suppression by the DO control is excessive. Therefore, the DO concentration is controlled to increase in the next cycle to accelerate the nitrification so that $T_g$ will coincide with $T_{gs}$.

Specifically, the DO preset value is adjusted according to equation (2):

$$DO_n = DO_{n-1} + K_2(T_{gs} - T_g) \ldots \quad (2)$$

where
$DO_n$: DO preset value of the first aeration tank in the next cycle,
$DO_{n-1}$: DO preset value of the first aeration tank in the current cycle,
$K_2$: constant,
$T_{gs}$: preset value of the sum of the aeration period and the denitrification period, and $T_g$: sum of the aeration period and the denitrification period in the current cycle.

Since the growth of nitrifying bacteria is suppressed only when the DO concentration is not more than 2 mg/l, the DO concentration is adjusted within this range. If the denitrification period is still short even with the DO concentration of 2 mg/l, it is judged that the nitrification ability of the activated sludge is lowered and a known measure for accelerating the nitrification ability is taken, for example, the activated sludge concentration is increased in the entire treatment apparatus.

The period $T_g$ may be an average (moving average) over several cycles before the current step of the sums of the aeration period and the denitrification period of the first aeration tank 2a.

Control on the second aeration tank 2b and resultant alteration of water quality are described below. A period $T_{ds}$ that corresponds to the one-cycle period of the control, i.e., the sum of the aeration period and the agitation period is set at 120 minutes. The aeration of the second tank 2b is started at the same time as the first aeration tank 2a, and during the aeration period $T_b$ the ordinary aeration is performed with the DO concentration set at 2-3 mg/l (suitable for the nitrification), to allow the nitrification and phosphorus absorption to proceed simultaneously. The nitrification is finished in the period $T_b$, and $NH_4$-N that has not been nitrified in the first aeration tank 2a is converted to $NO_3$-N. After the lapse of $T_b$, the process transfers to the agitation step to start the denitrification. Since the denitrification in the second aeration tank 2b is one due to endogenous respiration, the denitrification rate is relatively low and therefore the ORP decreases slowly. Upon completion of the denitrification, a bending point B (see FIG. 5(c)) appears on an ORP curve obtained by the second ORP meter 6b. The detection of the bending point B gives an agitation period $T_c$, and a period $T_d$ is obtained by adding $T_c$ to $T_b$. As shown in FIG. 5(c), $T_b$, $T_c$ and $T_d$ are 53 minutes, 60 minutes and 113 minutes, respectively. The one-cycle period of the control is finished upon the detection of the bending point B, and the first and second aeration tanks 2a and 2b return to the aeration step at the same time. As a result of the above control, the phosphorus release is performed in the first aeration tank 2a for 58 minutes, which means that a sufficient phosphorus release period is secured positively without being influenced by the quality of influent. The secured sufficiently long period of the phosphorus release leads to satisfactory phosphorus absorption in the aeration step to thereby provide a high phosphorus removal efficiency. Since the denitrification period of the second aeration tank 2b is determined by the quality of influent and the state of the activated sludge, a 7-minute difference from the preset period is corrected in the next cycle by adjusting the aeration period $T_b$ to equalize $T_d$ to $T_{ds}$. Specifically, the aeration period $T_b$ is adjusted according to equation (1) described above.

Since the DO concentration control range of the first aeration tank 2a is 1-2 mg/l, the suppression of the growth of nitrifying bacteria by the DO control is weak and there is no possibility that the nitrification rate becomes insufficient. While in the first aeration tank 2a the denitrification proceeds with organic matter being supplied from the influent, the denitrification also proceeds in the second aeration tank 2b. Therefore, the third control method can provide a high nitrogen removal efficiency not only when the nitrogen concentration is low but also when it is high. As in the case of the first control method, the phosphorus removal is completed by wasting, as excess sludge, the activated sludge that includes a large amount of phosphorus from the settling tank 4 (This step is not shown in FIG. 4). As described above, in the third control method the denitrification and phosphorus removal proceed satisfactorily.

A more specific example of the third method, which is based on an experiment, is described below. According to the third control method, the present inventors conducted a long-term control experiment for the simultaneous removal of nitrogen and phosphorus on a sewage sample prepared by mixing human feces, waste water from a restaurant, soapy water, tap water, sodium acetate, etc. using an apparatus having functions equivalent to those of the FIG. 4 apparatus. Table 1 shows the main specification of the experiment apparatus and experimental conditions.

TABLE 1

| | Item | Unit | Value |
|---|---|---|---|
| Aeration tanks | Water temperature | °C. | 20 ± 2 |
| | Hydraulic retention time | hour | 16.0 |
| | First aeration tank | | |
| | Capacity | l | 76 |
| | Aeration period ($T_e$) | minute | 30 |
| | Sum of aeration period and denitrification period ($T_{gs}$) | minute | 60 |
| | Second aeration tank | | |
| | Capacity | l | 74 |
| | Sum of aeration period and agitation period ($T_{ds}$) | minute | 120 |
| | MLSS | mg/l | 4,730 |
| | SRT | day | 24.0 |
| Settling tank | Hydraulic retention time | hour | 3.9 |
| | Surface-loading rate | m/day | 4.5 |
| | Recirculation ratio | % | 100 |

Figure 6A:
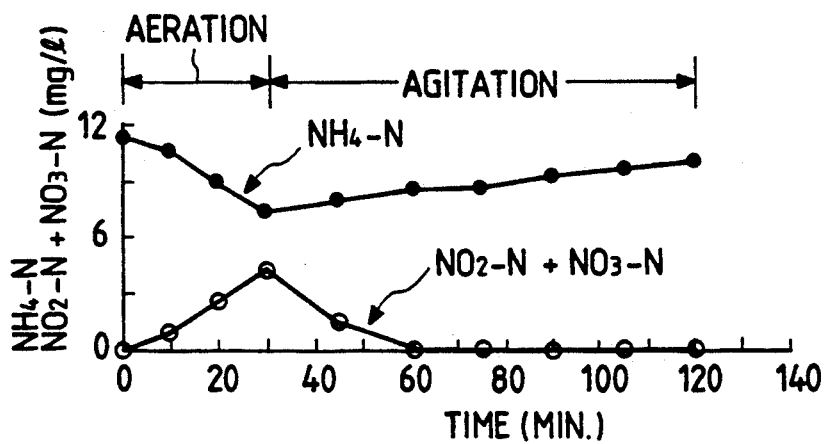
FIGS. 6(a)-6(d) are graphs showing variations of the $NH_4$-N and $(NO_2$-N$+NO_3$-N$)$ concentration, $PO_4$-P concentration, ORP, and DO concentration, respectively, of the first aeration tank with respect to the elapsed time in the third control method.
Figure 6B:
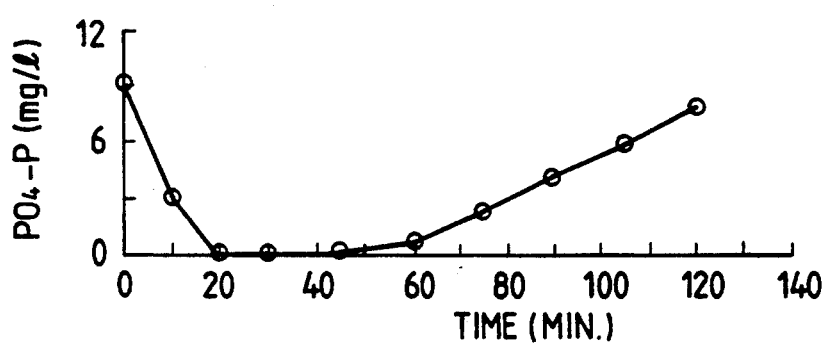
Figure 6C:
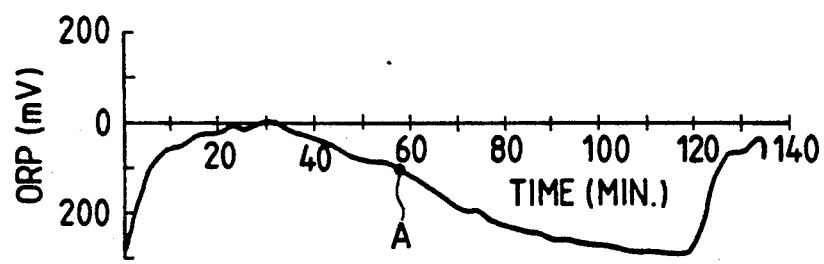
Figure 6D:
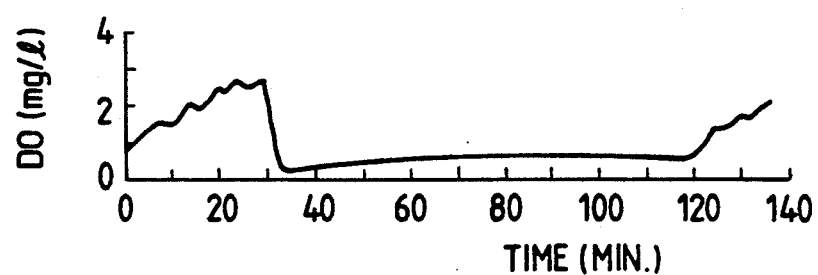
Figure 7A:
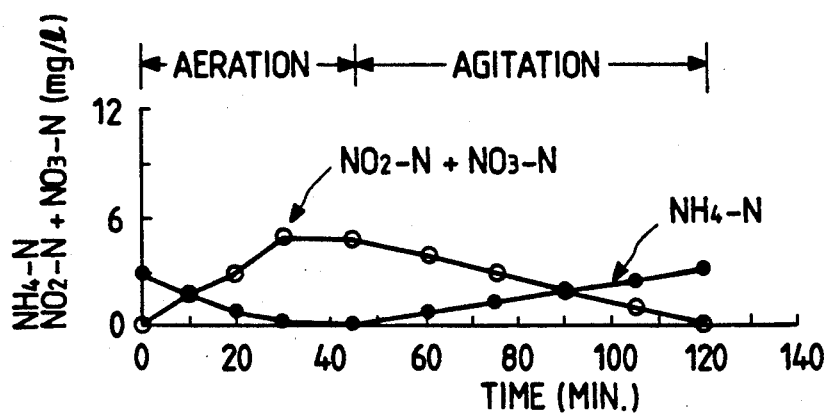
FIGS. 7(a)-7(d) are graphs showing variations of the $NH_4$-N and $(NO_2$-N$+NO_3$-N$)$ concentrations, $PO_4$-P concentration, ORP, and DO concentration, respectively, of the second aeration tank with respect to the elapsed time in the third control method.

Experimental results are shown in FIGS. 6(a)–6(d), 7(a)–7(d) and 8(a)–8(c) and Table 2. FIGS. 6(a)–6(d) show variations of water quality parameters in the first aeration tank 2a during a one-cycle period, more specifically, relationships with the elapsed time of the NH$_4$-N and (NO$_2$-N+-NO$_3$-N) concentrations (NO$_2$-N means nitrite nitrogen and is generated during the nitrification), PO$_4$-P (orthophosphate phosphorus) concentration, ORP, and DO concentration, respectively. The operation status of the first aeration tank 2a is indicated in FIG. 6(a). Similarly, FIGS. 7(a)–7(d) show variations of water quality parameters in the second aeration tank 2b during a one-cycle period, more specifically, relationships with the elapsed time of the NH$_4$-N and (NO$_2$-N+NO$_3$-N) concentrations, PO$_4$-P concentration, ORP, and DO concentration, respectively. The operation status of the second aeration tank 2b is indicated in FIG. 7(a).

In the first aeration tank 2a, the nitrification proceeds during the aeration period as shown in FIG. 6(a), and the denitrification takes about 30 minutes during the agitation period. The denitrification finishes when a bending point A appears as shown in FIG. 6(c). FIG. 6(b) shows that the phosphorus absorption occurs during the aeration period to lower the PO$_4$-P concentration, and that during the agitation period the phosphorus release proceeds after completion of the denitrification.

Figure 7B:
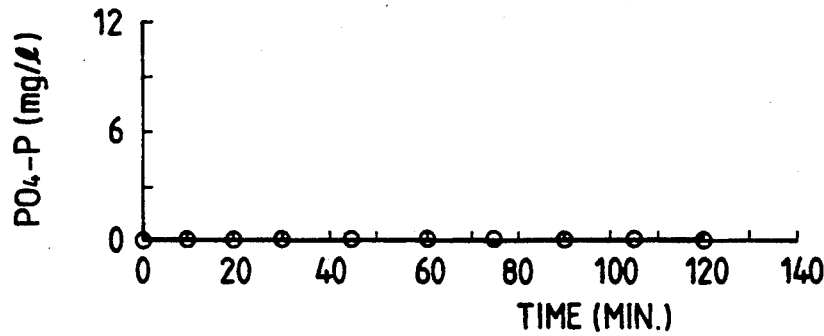
Figure 7C:
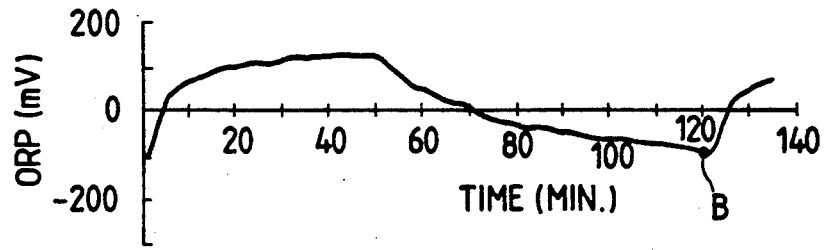
Figure 7D:
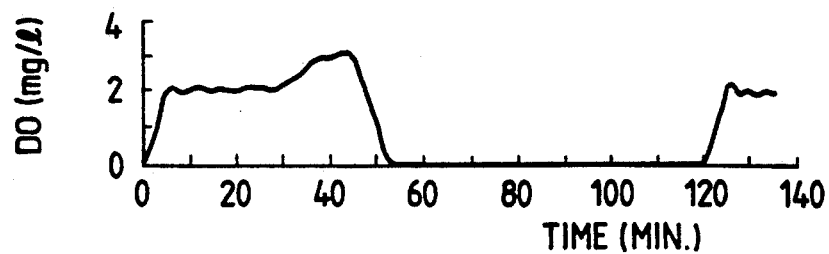

In the second aeration tank 2b, there proceed the nitrification during the aeration period and the denitrification during the agitation period as clearly seen from FIG. 7(a). As shown in FIG. 7(c), a bending point B appears when the denitrification is completed. As shown in FIG. 7(b), the PO$_4$-P concentration is very low, and the phosphorus release does not occur even during the agitation period.

As is understood from FIGS. 6(a)–6(d) and 7(a)–7(d), the nitrogen and phosphorus removal mechanism of the third control method works satisfactorily. On the other hand, Table 2 shows water quality that was obtained after continuous control of about 2 months.

TABLE 2

| | Unit | Influent | Effluent | Removal ratio (%) |
|---|---|---|---|---|
| COD | mg/l | 97.2 | 10.6 | 89.1 |
| TOC | mg/l | 126.7 | 6.5 | 94.9 |
| SS | mg/l | 145.1 | 3.8 | 97.4 |
| T-N (total nitrogen) | mg/l | 37.8 | 4.0 | 89.4 |
| T-P (total phosphorus) | mg/l | 3.97 | 0.18 | 95.5 |

As shown in Table 2, there were obtained satisfactory control results of a T-N removal ratio of 89.4 and a T-P removal ratio of 95.5. Further, the phosphorus concentration in the activated sludge was 3.1%, which indicates the existence of activated sludge having a high phosphorus removal capability.

Figure 8A:
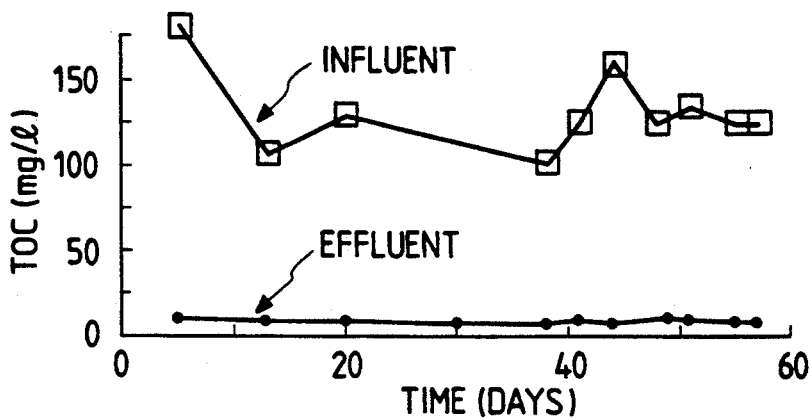
FIGS. 8(a)-8(c) are graphs showing variations of the concentrations of TOC, T-N and T-P, respectively, of influent and effluent with respect to the elapsed time in a continuous control experiment according to the third control method.
Figure 8B:
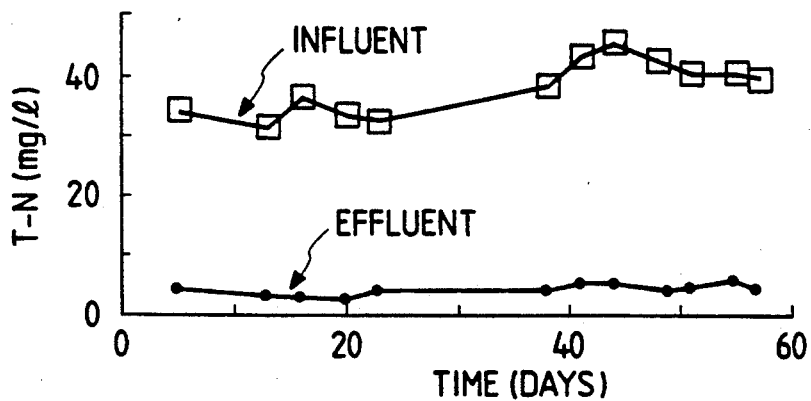
Figure 8C:
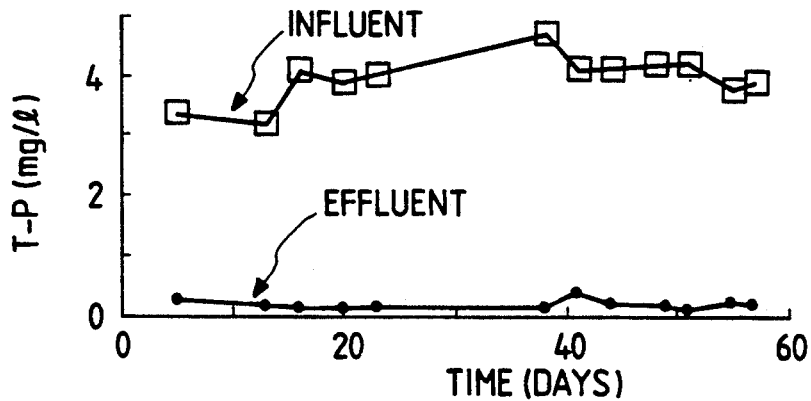

FIGS. 8(a)–8(c) show water quality of the continuous control experiment. More specifically, FIGS. 8(a)–8(c) show relationships with the elapsed time of the concentrations of TOC, T-N and T-P in the influent and the effluent, respectively. It is understood from FIGS. 8(a)–8(c) that the quality of the effluent changes only slightly even if the quality of the influent somewhat changes.

Next, a fourth control method of the invention is described. Since the fourth control method is basically the same as the third control method except for the method of detecting the completion of the agitation step of the second aeration tank 2b, a description is made only of that point here with reference to FIGS. 5(a)–5(c). In the agitation step of the second agitation tank 2b as shown in FIG. 5(c), the ORP curve has the bending point B (the ORP value is about −50 mV) when the denitrification is completed. According to the studies of the present inventors, in many cases the ORP value corresponding to the completion of the denitrification is within the range of +50 to −150 mV, and once the quality of influent and the operation conditions are determined the ORP at the bending point B takes an almost fixed value. Therefore, by experimentally predetermining the ORP value at the bending point B for a subject sewage treatment apparatus, the completion of the denitrification can be detected without detecting the bending point B. The fourth control method has the same relationship with the third control method as the second control method has with the first control method. Therefore, according to the fourth control method of the invention, an ORP threshold value of the second ORP meter 6b is set at a value that has been predetermined experimentally, and the agitation is stopped to transfer to the aeration step as soon as the ORP is decreased down to the threshold value.

Figure 9:
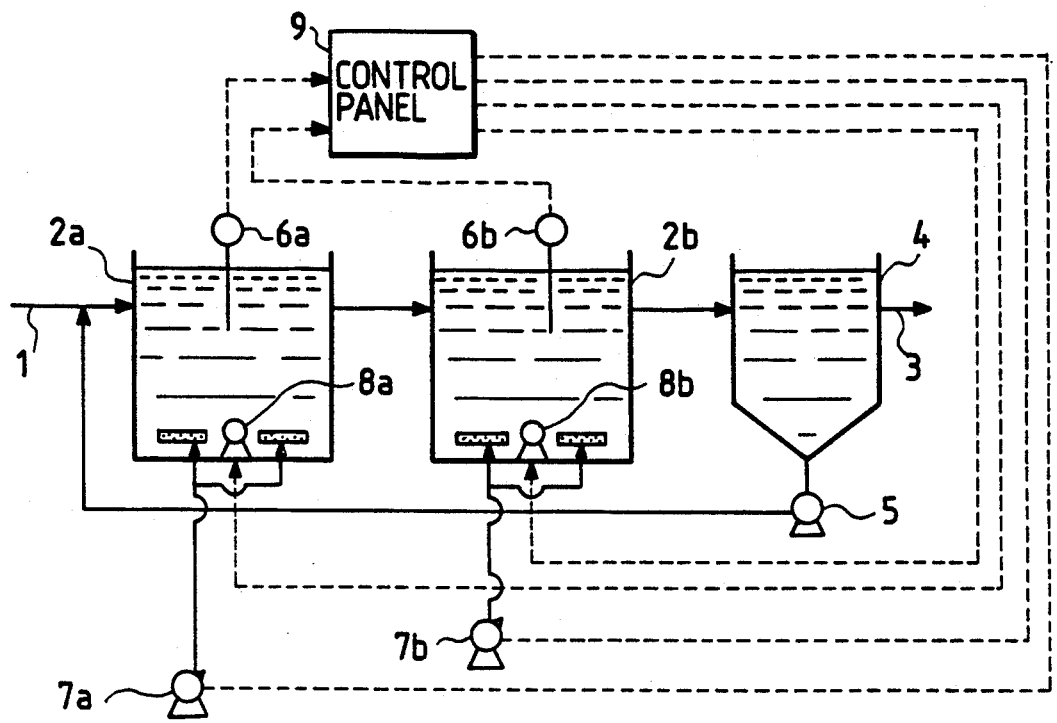
FIG. 9 schematically shows the main part of a sewage treatment apparatus to which fifth and sixth control methods of the invention are applied.

A fifth control method of the invention is described below with reference to the drawings. FIG. 9 schematically shows the main part of an intermittent aeration apparatus, including a control system, to which a fifth control method of the invention is applied. The parts common to those in FIG. 11 are represented by the same symbols, and descriptions therefor are omitted here. The apparatus of FIG. 9 is different from that of FIG. 11 in that the FIG. 9 apparatus does not have the DO meter 10a and the inverter 11a of the FIG. 11 apparatus but has a first ORP meter 6a applied to the first aeration tank 2a to detect an ORP bending point.

Figure 10A:
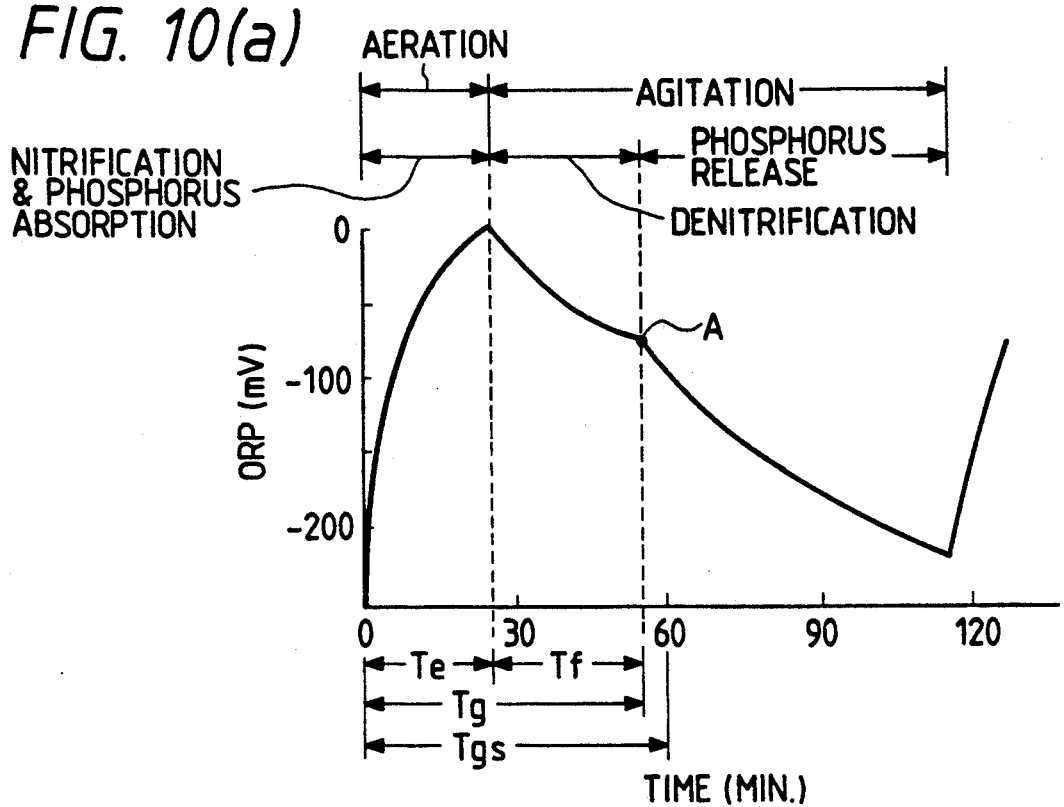
FIGS. 10(a) and 10(b) are graphs showing variations of the ORP of first and second aeration tanks, respectively, with respect to the elapsed time in the fifth and sixth control methods.
Figure 10B:
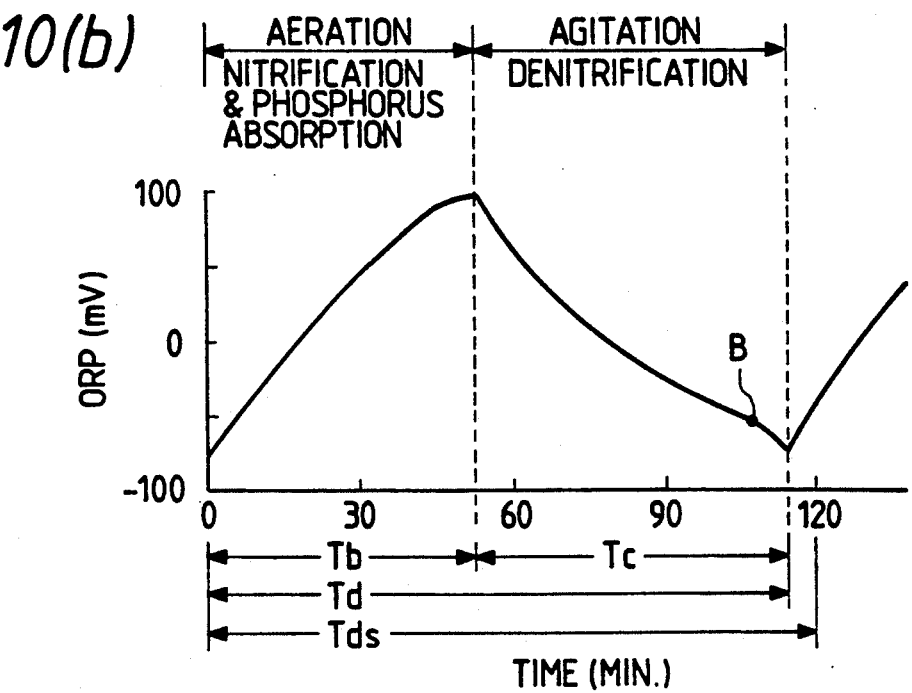

The fifth control method of the invention to be applied to the apparatus of FIG. 9 is described below also with reference to FIGS. 10(a) and 10(b). FIG. 10(a) is a graph showing an ORP variation of the first aeration tank 2a with respect to the elapsed time, and the operation status of the first aeration tank 2a is also indicated in FIG. 10(a). Similarly, FIG. 10(b) is a graph showing an ORP variation of the second aeration rank 2b with respect to the elapsed time, and the operation status of the second aeration tank 2b is also indicated in FIG. 10(b). The ORP variations shown in FIGS. 10(a) and 10(b) are ones taken at an arbitrary time point (the origin of the graphs is the aeration start time) while the fifth control method of the invention is being practiced. While the fifth control method is common to the third control method in many aspects, the former is different from the latter in that the period $T_g$ which is the sum of the aeration period $T_e$ and the denitrification period $T_f$ in the agitation step is controlled by adjusting the aeration period $T_e$.

As shown in FIG. 10(a), the period $T_{gs}$ is set at 60 minutes. During the aeration period $T_e$ of 25 minutes, the ordinary aeration is performed to have the nitrification and the phosphorus absorption proceed with the DO concentration controlled within the range of 2-3 mg/l. After the lapse of $T_e$, the process transfers to the agitation step to start the denitrification. In an ORP curve detected by the first ORP meter 6a, a bending point A appears 30 minutes after the start of the agitation. The denitrification period $T_f$ is measured by detecting the bending point A, and therefore the period $T_g$ is (25+30)=55 minutes. The period $T_g$ being 5-minutes shorter than the preset value $T_{gs}$ means that the aeration period $T_e$ that has been set based on the periods $T_g$ of the preceding cycle is insufficient. Since the denitrification period is determined by the water quality and the state of the activated sludge, the difference from the preset period $T_{gs}$ is corrected by adjusting the period $T_e$ so that $T_g$ coincides with $T_{gs}$.

Specifically, the aeration period $T_e$ is adjusted according to equation (3):

$$T_{en} = T_{en-1} + K_3(T_{gs} - T_g) \ldots \quad (3)$$

where
$T_{en}$: aeration period of the first aeration tank in the next cycle,
$T_{en-1}$: aeration period of the first aeration tank in the current cycle,
$K_3$: constant,
$T_{gs}$: preset value of the sum of the aeration period and the denitrification period, and
$T_g$: sum of the aeration period and the denitrification period in the current cycle.

The period $T_g$ may be an average (moving average) over several cycles before the current step of the sums of the aeration period and the denitrification period of the first aeration tank 2a.

Since the control on the second aeration tank 2b is the same as in the third control method of the invention, a description therefor is omitted here. In the fifth control method, since the DO concentration range of the first aeration tank 2a is 2-3 mg/l, there is no suppression of the growth of nitrifying bacteria by the DO control and there is no possibility that the nitrification rate becomes insufficient. While in the first aeration tank 2a the denitrification proceeds with organic matter being supplied from the influent, the denitrification also proceeds in the second aeration tank 2b. Therefore, the fifth control method can provide a high nitrogen removal efficiency not only when the nitrogen concentration is low but also when it is high. The phosphorus removal is completed by wasting, as excess sludge, the activated sludge that includes a large amount of phosphorus from the settling tank 4 (This step is not shown in FIG. 9). As described above, in the fifth control method the denitrification and phosphorus removal proceed satisfactorily.

Next, a specific example of the fifth control method is described based on experimental results. According to the fifth control method, the present inventors conducted a control experiment for about one month using the apparatus used for the above-described experiment according to the third control method. Table 3 shows the main specification of the apparatus and experimental conditions.

TABLE 3

| | Item | Unit | Value |
|---|---|---|---|
| Aeration tanks | Water temperature | °C. | 20 ± 2 |
| | Hydraulic retention time | hour | 16.0 |
| | First aeration tank | | |
| | Capacity | l | 76 |
| | Sum of aeration period and denitrification period ($T_{gs}$) | minute | 60 |
| | Second aeration tank | | |
| | Capacity | l | 74 |
| | Sum of aeration period and agitation period ($T_{ds}$) | minute | 120 |
| | MLSS | mg/l | 3,780 |
| | SRT | day | 21.0 |
| Settling tank | Hydraulic retention time | hour | 3.9 |
| | Surface-loading rate | m/day | 4.5 |
| | Recirculation ratio | % | 100 |

An example of experimental results is shown in Table 4.

TABLE 4

| | Unit | Influent | Effluent | Removal ratio (%) |
|---|---|---|---|---|
| COD | mg/l | 81.5 | 10.3 | 87.4 |
| TOC | mg/l | 116.2 | 7.8 | 93.3 |
| SS | mg/l | 121.0 | 6.0 | 95.0 |
| T-N (total nitrogen) | mg/l | 37.0 | 2.4 | 93.5 |
| T-P (total phosphorus) | mg/l | 6.0 | 0.49 | 91.8 |

As shown in Table 4, there were obtained satisfactory control results of a T-N removal ratio of 93.5% and a T-P removal ratio of 91.8%. The fifth control method of the invention can provide high nitrogen and phosphorus removal ratios.

Next, a sixth control method of the invention is described. Since the sixth control method is basically the same as the fifth control method except for the method of detecting the completion of the agitation step of the second aeration tank 2b, a description is made only of that point here. In the agitation step of the second agitation tank 2b as shown in FIG. 10(b), the ORP curve has the bending point B (the ORP value is about −50 mV) when the denitrification is completed. According to the studies of the present inventors, in many cases the ORP value corresponding to the completion of the denitrification is within the range of +50 to −150 mV, and once the quality of influent and the operation conditions are determined the ORP at the bending point B takes an almost fixed value. Therefore, by experimentally predetermining the ORP value at the bending point B for a subject sewage treatment apparatus, the completion of the denitrification can be detected without detecting the bending point B. Therefore, according to the sixth control method of the invention, an ORP threshold value of the second ORP meter 6b is set at a value that has been predetermined experimentally, and the agitation is stopped to transfer to the aeration step as soon as the ORP is decreased down to the threshold value. Since the remaining control is the same as of the fifth control method, a description therefor is omitted here.

In practicing the control methods of the invention, the capacity ratio of the first aeration tank 2a to the second aeration tank 2b need not be fixed to 1:1, but may be, for instance, 2:1. Even with the latter ratio, the control methods of the invention can be practiced satisfactorily to provide a good quality of the effluent. Further, the control methods of the invention can be applied to both of a case where the sewage continuously flows into the first aeration tank 2a and a case where it flows into the first aeration tank 2b intermittently. For example, the sewage may be input to the first aeration tank 2a only while it is in the agitation step. In this case, since the quantity of organic matter added under the anaerobic condition is increased, the phosphorus release quantity is increased and the phosphorus removal efficiency may be improved for influent having a certain type of water quality. Since the control methods of the invention can provide the anaerobic condition in the sewage input portion (i.e., first aeration tank), it is apparent that the filamentous bulking is unlikely to happen.

As described above, according to the first and second control methods of the invention, even if the influent has a low nitrogen concentration, sufficient phosphorus release period is secured in the first aeration tank and phosphorus can be eliminated efficiently. Since the nitrogen concentration is low, there is no possibility that the nitrification ability becomes insufficient and nitrogen can also be eliminated satisfactorily.

According to the third to sixth control methods, a sufficient phosphorus removal period is secured positively manner and phosphorus can be eliminated efficiently irrespective of the nitrogen concentration of the influent. That is, since the growth of nitrifying bacteria is scarcely suppressed in the first aeration tank, a high nitrification rate is maintained and nitrogen can be eliminated satisfactorily even if the nitrogen concentration of the influent is high. In this manner, the invention can improve the nitrogen and phosphorus removal rates irrespective of the nitrogen and phosphorus concentrations in the influent.

What is claimed is:

1. A control method in an intermittent aeration activated sludge process for eliminating nitrogen and phosphorus from sewage in which the sewage is input to an aeration tank where it is subjected to an aerobic condition under aeration and to an anaerobic condition under agitation with the aeration stopped that are alternately repeated, and the processed sewage is output via a settling tank with part of sedimented sludge removed as excess sludge and the remaining sedimented sludge returned to the aeration tank, said control method comprising the steps of:

preparing a first aeration tank for receiving sewage and a second aeration tank connected in series to the first aeration tank and having an ORP meter applied thereto;

in the first aeration tank, performing aeration for a first predetermined period and then stopping the aeration and starting agitation;

in the second aeration tank, controlling a sum of an aeration period and an agitation period to a second predetermined period longer than the first predetermined period based on a time when a bending point appeared on an ORP curve detected by the ORP meter in a previous cycle; and simultaneously transferring operations of the first and second aeration tanks from the agitation to the aeration based on detection of the bending point.

2. A control method in an intermittent aeration activated sludge process for eliminating nitrogen and phosphorus from sewage in which the sewage is input to an aeration tank where it is subjected to an aerobic condition under aeration and to an anaerobic condition under agitation with the aeration stopped that are alternately repeated, and the processed sewage is output via a settling tank with part of sedimented sludge removed as excess sludge and the remaining sedimented sludge returned to the aeration tank, said control method comprising the steps of:

preparing a first aeration tank for receiving sewage and a second aeration tank connected in series to the first aeration tank and having an ORP meter applied thereto;

in the first aeration tank, performing aeration for a first predetermined period and then stopping the aeration and starting agitation;

in the second aeration tank, controlling a sum of an aeration period and an agitation period to a second predetermined period longer than the first predetermined period based on a time when a measured value of the ORP meter reached a predetermined ORP value in a previous cycle; and simultaneously transferring operations of the first and second aeration tanks from the agitation to the aeration based on detection of the predetermined ORP value.

3. A control method in an intermittent aeration activated sludge process for eliminating nitrogen and phosphorus from sewage in which the sewage is input to an aeration tank where it is subjected to an aerobic condition under aeration and to an anaerobic condition under agitation with the aeration stopped that are alternately repeated, and the processed sewage is output via a settling tank with part of sedimented sludge removed as excess sludge and the remaining sedimented sludge returned to the aeration tank, said control method comprising the steps of:

preparing a first aeration tank having a DO meter and a first ORP meter applied thereto, for receiving sewage and a second aeration tank connected in series to the first aeration tank and having a second ORP meter applied thereto;

in the first aeration tank, controlling a DO concentration during an aeration step so that a sum of an aeration period and a denitrification period Of an agitation step becomes equal to a first predetermined period based on a time when a first bending point appeared on an ORP curve detected by the first ORP meter in a previous cycle;

in the second aeration tank, controlling a sum of an aeration period and an agitation period to a second predetermined period longer than the first predetermined period based on a time when a second bending point appeared on an ORP curve detected by the second ORP meter in a previous cycle; and simultaneously transferring operations of the first and second aeration tanks from the agitation to the aeration based on detection of the second bending point 4. A control method in an intermittent aeration activated sludge process for eliminating nitrogen and phosphorus from sewage in which the sewage is input to an aeration tank where it is subjected to an aerobic condition under aeration and to an anaerobic condition under agitation with the aeration stopped that are alternately repeated, and the processed sewage is output via a settling tank with part of sedimented sludge removed as excess sludge and the remaining sedimented sludge returned to the aeration tank, said control method comprising the steps of:

preparing a first aeration tank having a DO meter and a first ORP meter applied thereto, for receiving sewage and a second aeration tank connected in series to the first aeration tank and having a second ORP meter applied thereto;

in the first aeration tank, controlling a DO concentration during an aeration step so that a sum of an aeration period and a denitrification period of an agitation step becomes equal to a first predetermined period based on a time when a first bending point appeared on an ORP curve detected by the first ORP meter in a previous cycle;

in the second aeration tank, controlling a sum of an aeration period and an agitation period to a second predetermined period longer than the first predetermined period based on a time when a measured value of the second ORP meter reached a predetermined. ORP value in a previous cycle; and simultaneously transferring operations of the first and second aeration tanks from the agitation to the aeration based on detection of the predetermined ORP value.

5. A control method in an intermittent aeration activated sludge process for eliminating nitrogen and phosphorus from sewage in which the sewage is input to an aeration tank where it is subjected to an aerobic condition under aeration and to an anaerobic condition under agitation with the aeration stopped that are alternately repeated, and the processed sewage is output via a settling tank with part of sedimented sludge removed as excess sludge and the remaining sedimented sludge returned to the aeration tank, said control method comprising the steps of:

preparing a first aeration tank having a first ORP meter applied thereto, for receiving sewage and a second aeration tank connected in series to the first aeration tank and having a second ORP meter applied thereto;

in the first aeration tank, controlling a sum of an aeration period and a denitrification period of an agitation step to a first predetermined period based on a time when a first bending point appeared on an ORP curve detected by the first ORP meter in a previous cycle;

in the second aeration tank, controlling a sum of an aeration period and an agitation period to a second predetermined period longer than the first predetermined period based on a time when a second bending point appeared on an ORP curve detected by the second ORP meter in a previous cycle; and simultaneously transferring operations of the first and second aeration tanks from the agitation to the aeration based on detection of the second bending point.

6. A control method in an intermittent aeration activated sludge process for eliminating nitrogen and phosphorus from sewage in which the sewage is input to an aeration tank where it is subjected to an aerobic condition under aeration and to an anaerobic condition under agitation with the aeration stopped that are alternately repeated, and the processed sewage is output via a settling tank with part of sedimented sludge removed as excess sludge and the remaining sedimented sludge returned to the aeration tank, said control method comprising the steps of:

preparing a first aeration tank having a first ORP meter applied thereto, for receiving sewage and a second aeration tank connected in series to the first aeration tank and having a second ORP meter applied thereto;

in the first aeration tank, controlling a sum of an aeration period and a denitrification period of an agitation step to a first predetermined period based on a time when a first bending point appeared on an ORP curve detected by the first ORP meter in a previous cycle;

in the second aeration tank, controlling a sum of an aeration period and an agitation period to a second predetermined period longer than the first predetermined period based on a time when a measured value of the second ORP meter reached a predetermined ORP value in a previous cycle; and simultaneously transferring operations of the first and second aeration tanks from the agitation to the aeration based on detection of the predetermined ORP value.

7. The control method of any one of claims 1, 3 and 5, wherein the bending point appearance time of the second aeration tank is an average of bending point appearance times of a plurality of previous cycles.

8. The control method of any one of claims 2, 4 and 6, wherein the predetermined ORP value detection time is an average of predetermined ORP value detection times of a plurality of previous cycles.

9. The control method of any one of claims 3 to 6, wherein the first bending point appearance time is an average of first bending time appearance times of a plurality of previous cycles.

10. The control method of any one of claims 1 to 6, wherein in the second aeration tank, the aeration period is controlled to equalize the sum of the aeration period and the agitation period to the second predetermined period.

11. The control method of claim 5 or 6, wherein in the first aeration tank, the aeration period is controlled to equalize the sum of the aeration period and the denitrification period to the first predetermined period.

* * * * *

UNITED STATES PATENT AND TRADEMARK OFFICE
CERTIFICATE OF CORRECTION

PATENT NO. : 5,304,308
DATED : April 19, 1994
INVENTOR(S) : Kazushi Tsumura et al.

It is certified that error appears in the above-indentified patent and that said Letters Patent is hereby corrected as shown below:

Claim 3, Column 18, Line 64 change "Of" to --of--.

Claim 4, Column 19, Line 41 before "ORP" delete --.--.

Signed and Sealed this

Tenth Day of January, 1995

BRUCE LEHMAN

Attest:

Attesting Officer

Commissioner of Patents and Trademarks